United States Patent
Wasowicz

[19]

[11] Patent Number: 6,146,147
[45] Date of Patent: Nov. 14, 2000

[54] INTERACTIVE SOUND AWARENESS SKILLS IMPROVEMENT SYSTEM AND METHOD

[75] Inventor: Jan Wasowicz, Evanston, Ill.

[73] Assignee: Cognitive Concepts, Inc., Evanston, Ill.

[21] Appl. No.: 09/039,194

[22] Filed: Mar. 13, 1998

[51] Int. Cl.[7] ................................................... G09B 5/00
[52] U.S. Cl. ..................... 434/169; 434/118; 434/307 R; 434/167; 704/1; 704/270
[58] Field of Search ................................. 434/118, 169, 434/167, 170, 171, 176, 201, 185; 463/23, 35, 30; 273/454, 460, 272, 273, 237

[56] References Cited

U.S. PATENT DOCUMENTS

| | | | |
|---|---|---|---|
| 4,166,452 | 9/1979 | Generales, Jr. | 128/741 X |
| 4,285,517 | 8/1981 | Morrison | 273/1 GC |
| 4,363,482 | 12/1982 | Goldfarb | 273/1 GC X |
| 4,770,416 | 9/1988 | Shimizu et al. | 273/1 GC X |

(List continued on next page.)

OTHER PUBLICATIONS

*Innerlogic Reading Edge: Educator's Guide*, Innerlogic Software (1998).
*Central Test Battery*, Precision Acoustics (1998).
R. Haaf et. al., "Computer–Based Language Assessment Software: The Effects of Presentation and Response Format", *Language, Speech, and Hearing Services in Schools*, vol. 3, pp. 68–74 (1999).
*Phonemic Awareness in Young Children: A Classroom Curriculum*, Chapter 10 by Paul H. Brookes Publishing Co. (1998).
J.K. Torgesen et al., *Test of Phonological Awareness: Examiner's Manual*, Pro–Ed, (1994).
C.H. Lindamood et al., *The LAC Test (Lindamood Auditory Conceptualization Test) Revised Edition—Manual* (1994).
J.K. Torgesen et al., "*TOWRE—Test of Word Reading Efficiency—Examiner's Manual*", Pro–Ed (1999).
R.K. Wagner et al., "*CTOPP—Comprehensive Test of Phonological Processing—Examiner's Manual*", Pro–Ed (1999).
Auditory Processing Enhancement Programs, vol. 2: Auditory Discrimination/Phonolgical Awareness, Academic Communication Associates (1997).
Perceive & Respond vol. 1: Environmental Sounds—Second Edition, Academic Communication Associates (1997).
Perceive & Respond vol. 2: Listening for Auditory Differences—Second Edition, Academic Communication Associates (1997).
Perceive & Respond vol. 3: Auditory Sequential Memory—Second Edition Academic Communication Associates (1997).
Assessment and Instruction in Phonolgical Awareness, Florida Dept. of Education (1999).
Central Test Battery, Precision Acoustics.

*Primary Examiner*—Jessica J. Harrison
*Assistant Examiner*—Chanda Harris
*Attorney, Agent, or Firm*—Gray Cary Ware & Freidenrich LLP

[57] ABSTRACT

An interactive phonological and auditory skills improvement system is provided. The system includes a microprocessor, a display connected to the microprocessor, and a speaker connected to the microprocessor. Phonological game logic is run on the microprocessor, the phonological game logic provides at least one audible sound through the speaker and a phonological test regarding said at least one sound. A user responds to the phonological test which is graphically displayed on the display screen using an input device. Auditory game logic is also run on the microprocessor. The auditory game logic provides at least one audible sound through the speaker and an auditory test regarding said at least one sound. The user must respond to the auditory test using the input device. The auditory test is also graphically displayed on the display screen.

72 Claims, 5 Drawing Sheets

Microfiche Appendix Included
(5 Microfiche, 409 Pages)

U.S. PATENT DOCUMENTS

| | | |
|---|---|---|
| 5,149,084 | 9/1992 | Dalebout et al. . |
| 5,513,126 | 4/1996 | Harkins et al. . |
| 5,579,469 | 11/1996 | Pike . |
| 5,649,826 | 7/1997 | West et al. . |
| 5,692,906 | 12/1997 | Corder . |
| 5,694,546 | 12/1997 | Reisman . |
| 5,727,950 | 3/1998 | Cook et al. . |
| 5,743,743 | 4/1998 | Ho et al. . |
| 5,743,746 | 4/1998 | Ho et al. . |
| 5,751,953 | 5/1998 | Shiels et al. . |
| 5,762,503 | 6/1998 | Hoo et al. . |
| 5,836,771 | 11/1998 | Ho et al. . |
| 5,863,208 | 1/1999 | Ho et al. . |
| 5,884,302 | 3/1999 | Ho . |
| 5,920,838 | 6/1999 | Mostow et al. ............... 704/255 X |
| 5,927,988 | 7/1999 | Jenkins et al. ............... 434/116 X |
| 5,934,909 | 8/1999 | Ho et al. . |
| 5,934,910 | 8/1999 | Ho et al. . |
| 5,944,530 | 8/1999 | Ho et al. . |
| 5,957,699 | 9/1999 | Peterson et al. . |
| 5,967,793 | 10/1999 | Ho et al. . |
| 6,009,397 | 12/1999 | Siegel ............... 704/270 X |

INTERACTIVE SOUND AWARENESS SKILLS IMPROVEMENT SYSTEM AND METHOD

A portion of the disclosure of this patent document contains material which is subject to copyright protection. The Copyright owner has no objection to the facsimile reproduction by anyone of the patent document or the patent disclosure, as it appears in the Patent and Trademark Office patent file or records, but otherwise reserves all copyright rights whatsoever.

Microfiche Appendix A filed with this patent application, contains 5 microfiche pages and 409 frames (including cover sheets and targets).

BACKGROUND OF THE INVENTION

The present invention relates to an auditory and phonological development apparatus and method, and more particularly to an interactive apparatus and method which provides systematic auditory and phonological training in the form of a series of interactive games.

Strong auditory and phonological skills are necessary for learning how to speak, read, and spell. Unfortunately, many children will not develop adequate listening skills and sufficient awareness of sounds of language without systematic auditory and phonological training. A number of known training techniques are available for the development and enhancement of auditory and phonological processing skills. These known techniques are based on a significant number of scientific studies and decades of clinical experience which have been reported in the pertinent professional literature. This literature teaches that children benefit from systematic sensory training and systematic instruction in auditory processing and metaphonological skills.

Although such techniques are known, implementation of these techniques has traditionally been available only through the use of professionals. Therefore, a need exists for a system which children (or even adults in appropriate circumstances) can use to help train themselves in auditory and phonological skills at their own pace, without the direct use of a professional with the benefit of the precise and systematic control of learning parameters afforded by the use of computer technology.

One system which is currently being marketed provides auditory training programs on a computer over the internet. This system, however, does not provide phonological training or the range of auditory training as defined below.

Auditory skills, as defined by those skilled in the art and as used defined herein, are the skills required for central auditory processes. Central auditory processes are the auditory system mechanisms and processes which are responsible for several behavioral phenomena including sound localization and lateralization, auditory discrimination, auditory pattern recognition, temporal aspects of audition, including temporal resolution, masking, integration, and ordering. Central auditory processes are also the mechanisms and processes which are responsible for auditory performance decrements with competing acoustic signals and auditory performance decrements with degraded acoustic signals. See, Central Auditory Processing Current Status of Research and Implications for Clinical Practice, Task Force on Central Auditory Processing Consensus Development, American Speech-Language-Hearing Association, American Journal of Audiology, Vol. 5, pp. 41–54, 1996.

Phonological (or metaphonological) skills, as defined in the art and as defined herein, are those skills necessary for the conscious ability to detect and manipulate individual speech sounds (i.e., phonemes and syllables), e.g., move, combine, separate and delete speech sounds and syllables. A phoneme is the smallest unit of speech that serves to establish differences in word meaning within a language or dialect. A phoneme may vary in its acoustic properties to the extent that the differences in acoustic properties do not alter the meaning of the utterance. For example, [tap vs. $t^h$ap]. These phonological skills are those skills necessary for the awareness of speech sounds in spoken words, in contrast to written words.

Auditory skills include auditory attention, auditory figure-ground discrimination, auditory discrimination and auditory (sequential) memory. Auditory attention as defined herein is the ability to maintain purposeful focus to sound over extended periods of time. Auditory figure-ground discrimination as defined herein is the ability to focus on sound in the presence of competing background noise. Auditory discrimination as defined herein is the ability to tell whether two sounds are the same or different. This auditory discrimination includes consonant as well as vowel discrimination. Auditory (sequential) memory as defined herein is the ability to remember sounds and words (in sequential order). Auditory segmentation as defined herein is the ability to detect and count the number of sounds.

Phonological skills, on the other hand, include phoneme and syllable synthesis, phoneme and syllable segmentation, phoneme identification, and phonological awareness. Sound-symbol correspondence as defined herein is the ability to associate a sound with an alphabetic letter. Rhyming awareness as defined herein is the ability to recognize sound patterns. Phoneme and syllable synthesis as defined herein is the ability to blend sounds into syllables and syllables into words. Phonemic segmentation is defined herein as the ability to detect and count the number of sounds and syllables in a word. Phonemic identification as defined herein is the ability to recognize a phonemic sound and store an adequate representation of the sound in longterm memory. Phonological awareness as defined herein is the ability to identify sounds and sound sequences within a word.

Therefore, it is desirable to have an adaptive training arrangement which would allow a child (or other user) to work independently to develop auditory skills and phonological skills. It is also desirable to have an adaptive learning tool which would help the child progress on a step-by-step manner to more challenging levels at his or her own rate of learning with systematic and precise control of learning parameters. In addition to providing a system which can help train children in auditory and phonological skills, it would be desirable to have a system which would entice the children to want to use the system.

Therefore, in view of the above, it is an object of the present invention to provide a system which a child or other user may utilize to help train him or her in auditory and phonological skills without the use of a professional in an interactive and fun manner.

SUMMARY OF THE INVENTION

To achieve the foregoing, the present invention provides a series of interactive multi-media games which may be used in conjunction with a microprocessor to provide sophisticated computer-training techniques. These computer training techniques include adaptive training to develop the auditory is and phonemic awareness skills that are critical for speech and language development and academic success.

The present invention is a system comprised of a microprocessor, a display, such as a computer monitor, and an input device, such as a mouse, which is programmed with logic which provides both auditory and phonological skill interactive games. A game program or logic is run on the microprocessor and displayed on the display. The game logic is comprised of multi-level interactive games which test and train the user in both auditory skills and phonological skills. The input device is used to select the desired game from the program and to select the correct answers in response to queries from the program. The system includes a speaker system which provides the audible part of the games.

In a preferred embodiment, the system also includes logic for creating and displaying a user data record for each player showing the primary skill targeted during play of each game and learning objectives for each game. The user data record includes information such as the date, the specific parameters of the levels at which the user played and a cumulative score for each level played.

DETAILED DESCRIPTION OF THE PRESENTLY PREFERRED EMBODIMENT

Figure 1:
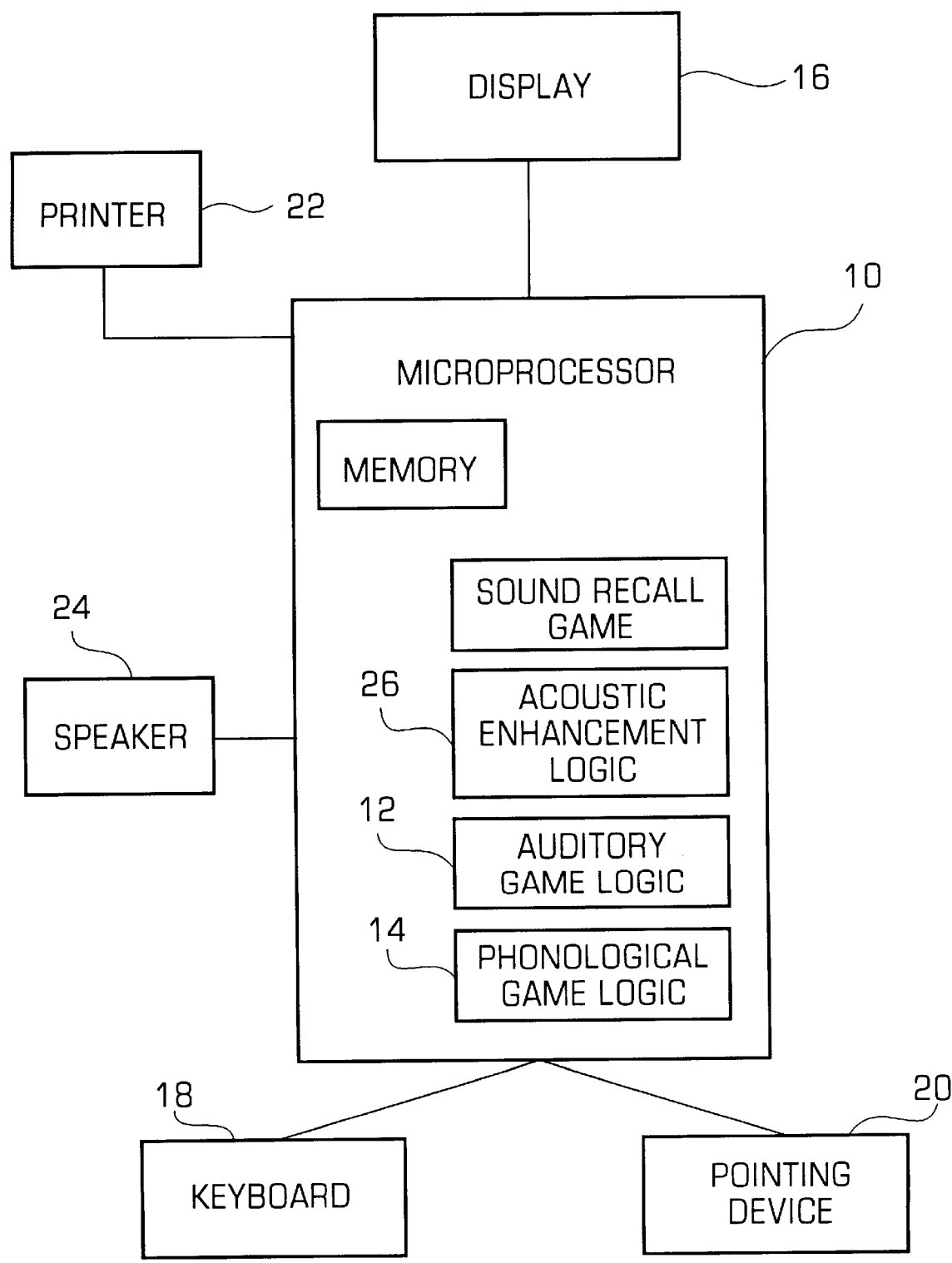
FIG. 1 is a schematic representation of a system using the present invention.

Referring now specifically to FIG. 1, a schematic illustration of the invention is illustrated. The invention comprises a microprocessor 10 which is connected in a manner known in the art to a display 16. A printer 22 may also be connected to the microprocessor to serve as an optional display of the results as described in more detail below. The microprocessor 10 is connected to an input device such as a keyboard 18. Preferably, the invention may also comprise an input device in the form of a pointing device 22. The pointing input device 22 may be, for example, a mouse, track ball, touch pad, etc. A speaker, or speaker system, 24 is connected to provide the audible part of the invention. The microprocessor 10, display 16, keyboard 18, pointer device 20, speaker 24, and printer 22, may be for example, a personal computer with all of these features. The microprocessor 10 runs an auditory game program or logic 12 and a phonological game program or logic 14 as described in more detail below.

An acoustic enhancement program or logic 26 is also preferably run on the microprocessor 10 as described in more detail below.

In the presently preferred embodiment, the auditory logic 12, phonological game logic 14, and acoustic enhancement logic 26 are loaded to be run on the microprocessor 10 of a personal computer by providing these programs on a compact disk or other suitable disks. The present invention may also be implemented using systems such as the internet, network systems or other wired or wireless systems.

It will be recognized by those skilled in the art that obviously the invention may also be implemented on a dedicated-type computer where the auditory game logic 12, phonological game logic 14 and the acoustic enhancement logic 26 are loaded to run on the microprocessor 10 by means including ROMs or other permanent or semi-permanent type memory devices or any other suitable system. It will also be recognized by those skilled in the art that the invention may be implemented by means of dedicated circuitry.

With the invention, the auditory game logic 12 and/or phonological game logic 14 provide a series of games to be played by the user. The games each provide an audible sound, as described in more detail below, through the speaker 24 which will test the user's auditory and/or phonological skills. The player is provided with a game-type environment (such as cartoon characters) which are perceived to provide the audible sounds to the speaker 24.

The display screen 16 is used to display the visible part of the game and to provide a means for the player to answer or respond to the auditory and/or phonological testing of the game logic 12 and/or phonological game logic 14. The player uses the keyboard 18 and/or the pointer device 20 to respond to the test using a cursor on the display screen 16.

Figure 2A:
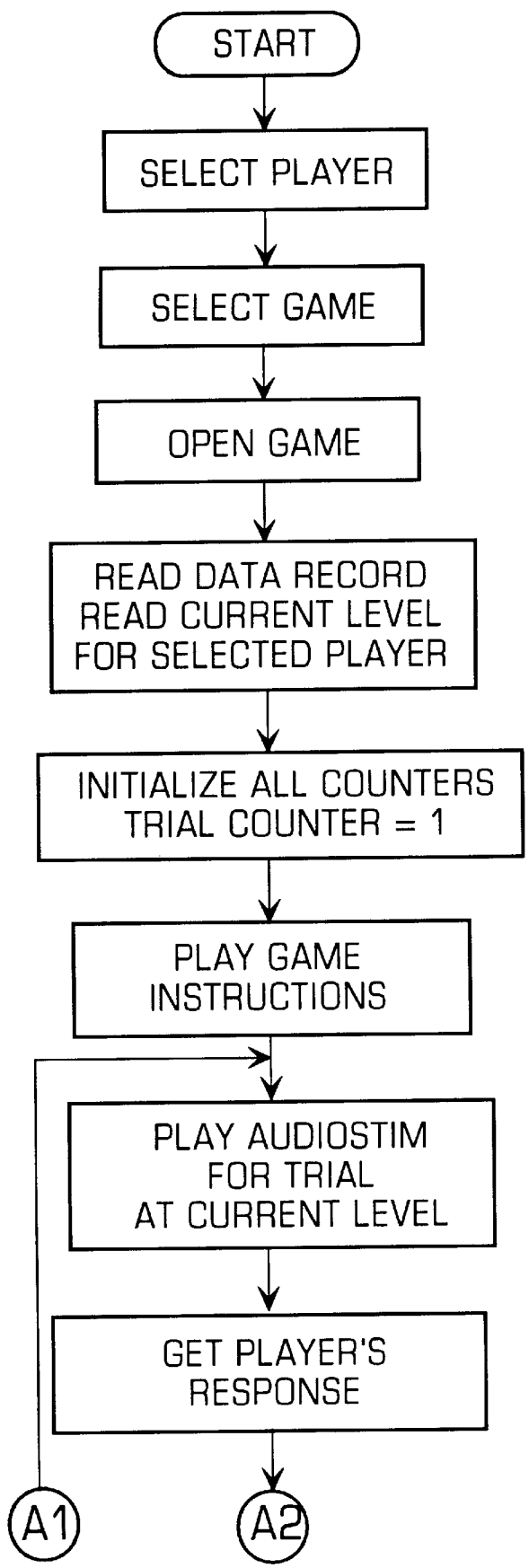
FIGS. 2A and 2B are a flow chart showing a general representation of the logic for advancing through the games of the preferred embodiment of the present invention.
Figure 2B:
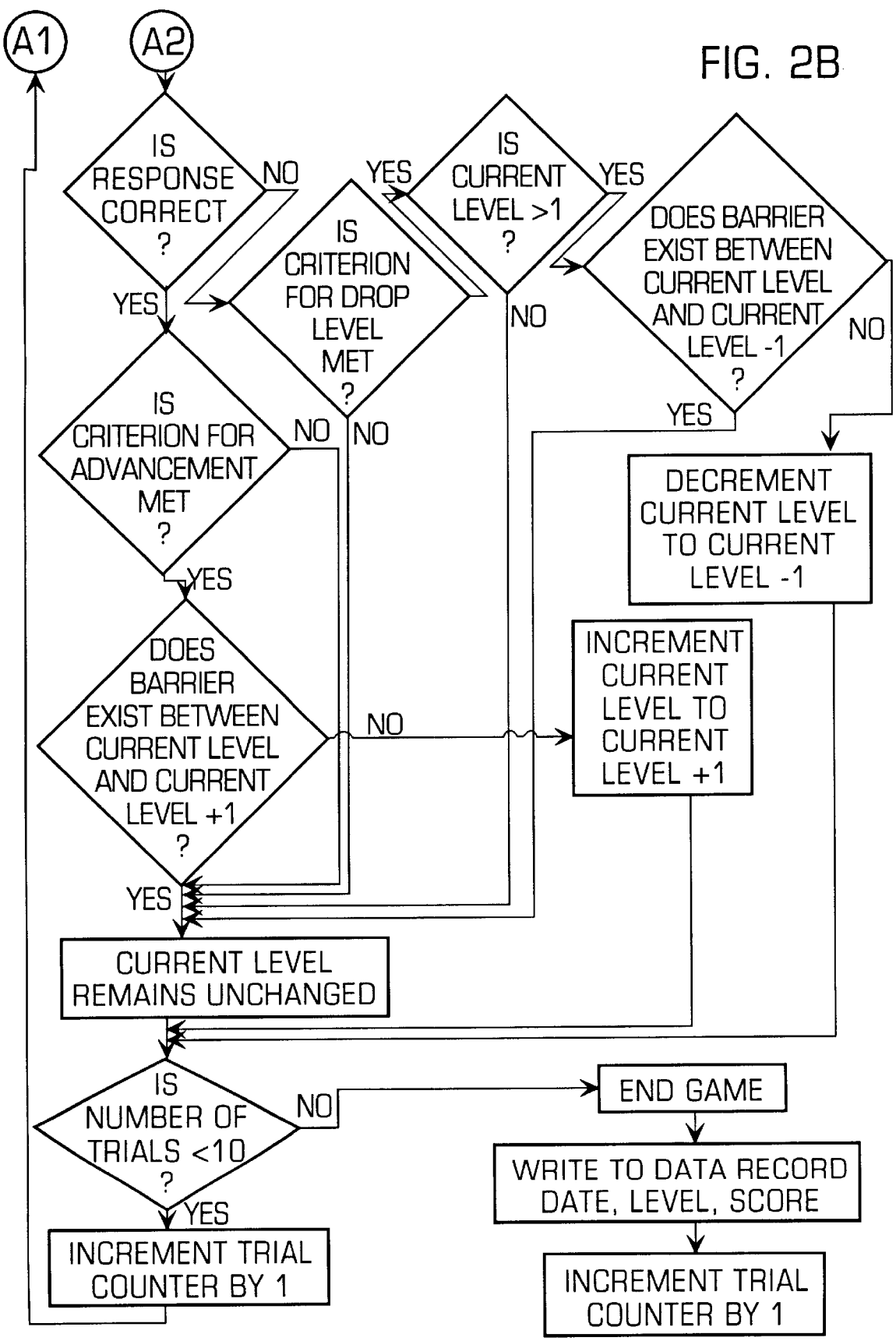

The player is prompted to provide some answer or response to the games being played and must preferably do so within a specified period of time. If the player responds correctly to a predetermined number of consecutive trials or tests, the player advances to a next level in the game. In some games, if the player provides a predetermined number of consecutive incorrect responses, the player is moved back to a previous level. A flow chart showing a general representation of the logic for each of the games and for advancing through the games of the present invention is shown in FIG. 2. A listing of all of the program for the presently preferred embodiments of the system of the present invention is attached as microfiche appendix A.

The system may also include a speech recognition system.

In a preferred embodiment of the present invention the game program or logic also provides a main menu which appearance on the display 16. In the preferred embodiment, the main menu program prompts the user to enter the user's name using the keyboard 18. This is particularly important since as discussed below, the system preferably tracks each user's progress individually. The main menu also provides a list for the user to select one of the series of games in the program, preferably using a game icon for each game. As discussed in more detail below, the main menu also includes the option of accessing a progress report or chart. The progress report chart may be printed on printer 22. In a particularly preferred embodiment, a special reporting feature is also provided on the main menu.

In the preferred embodiment, the player is provided with the option of exiting a game or pausing or suspending the play of a game before the game has ended. This feature may be toggled off.

All of the games also provide the user or player with the option to replay a sound or word that is presented to the user. This option resets a response timer, which is described in more detail below. This feature may be toggled off.

In a preferred embodiment, immediately after a sound or word is presented through speaker 24, a visible notification is provided on the screen 16 to let the user know the sound or word has been presented. This may be for example, in the form of a particular icon (e.g. a speaker icon) which would appear on the display screen 16.

In a preferred embodiment, the system prevents the cursor from appearing on the screen 16 during the time that a game is providing an auditory presentation. This prevents the user from attempting to respond before the auditory presentation is complete.

In a preferred embodiment of most of the games, a predetermined time period is selected for the user to respond to an auditory presentation, for example a five or ten second time period. If this interval elapses before the player has completed a response, that play of the round will be treated as an incorrect response. It will be apparent to those skilled in the art that some games may provide a shorter time period than others.

In the presently preferred embodiment, the games in the auditory game logic 10 and phonological game logic 14 are comprised of rounds with each round including ten auditory presentations and responses. Each response is displayed in a score box on the game screen with an indicator as to whether or not the response was correct. In each of the games, a predetermined criteria is required to advance to the next level. This criteria comprises a predetermined number of correct responses. In addition, in the preferred embodiment for at least some of the games if a predetermined number of incorrect responses are given consecutively within the same round of play, the user will be moved back to the previous level. Additionally, in the preferred embodiment for some of the games, a player may not advance levels until the start of the next round of play even though the criterion for advancement has been met.

In a preferred embodiment, a progress chart is provided which tracks the user's progress for each game. The progress chart is also automatically updated and stored in a memory, such as the computer's memory, after each round of play. The progress chart may be, for example, a number of circles which are filled in as the user advances with each game and an indication, such as an icon, of each game below the circles. Preferably, there will be some indication such as highlighting, indicating the highest level achieved by each player for each particular game.

In a presently preferred embodiment, the game logic 12 and 14 includes nine different games, each which tests the auditory and/or phonological skills of the user.

In a first game, nine picture boxes appear on the screen. A cartoon character, such as a clown holding a number of balloons, presents a sound effect through the speaker 24. The sounds comprise environmental sounds, words, numbers, and speech sounds. The object of the game is to teach the player to recall a series of the environmental sounds, words, numbers and speech sounds. A series of pictures are presented on the display 16. One of the pictures corresponds to the sound presented by the clown.

The game provides a visual indication that the response time has started (the response timer has been set) by the clown letting a balloon free from his hands. The player must respond before the balloon pops. To respond, the player positions the cursor (using the keyboard 18 or mouse-type device 20) over the picture that corresponds with the sound effect and clicks on the picture before a balloon which is let go by the clown's pops. After three consecutive correct responses, the game automatically advances by increasing the number of sound effects. When two sound effects are presented, the user must click on both corresponding pictures in the order that the sounds were presented. If two incorrect consecutive responses are given within the same round of play, the player is moved back to the previous level. If the player continues to advance levels by providing three consecutive correct responses, the game advances in difficulty by increasing the number of sounds, concealing the pictures until after the sounds have been presented, and varying the types of sounds. Also at least one and preferably three different levels of background noise is added.

This particular game tests and improves auditory (sequential) memory, figure-ground discrimination, identification, discrimination and attention.

In a second game used in the preferred embodiment, a cartoon train is used to teach recognition of long vowels, short vowels, and consonant sounds. In this game, the player tries to load up each of the cars in the train with coal by identifying sounds and the position of sounds within words.

In a first part of the game the player is tested and trained to see if he or she heard a particular sound. The train introduces a target sound. A box appears on the display screen 16 displaying the letter that represents the target sound. A second box appears on the screen 16 and displays the letter with a strike through it (indicating that it is not the target sound). If the sound corresponds to the letter displayed, the player places the cursor over the box containing the letter and clicks on the box before the train rolls away. The rolling away of the train indicates that the response timer has started. If the sound is not the target sound, the player must click on the box with the striked-out letter. The game starts out showing ten empty boxes. If the player responds correctly to a trial, one of the boxes is filled with a picture of the engine of the train. This provides immediate graphic feedback to the player. If the player responds incorrectly, the box is filled with railroad tracks. The other games have similar immediate feedback features.

In this game, if the player has four consecutive correct responses during the same round, the game increases the level of difficulty by presenting a word through speaker 24. The presented word may or may not contain the target sound. If the target sound is in the word, the player must click on the box containing the letter. If the target sound is not in the word, the player must click on the box with the striked-out letter. Again, after two consecutive incorrect responses, the level of play is automatically decreased and the target sound is presented again in isolation (not in a word). As the player advances levels, and becomes proficient at identifying the target sound in a word, the game continues to increase the difficulty by introducing more challenging sounds. In this embodiment, this game contains a second part or activity. In the second part, the player must indicate if the letter sound is heard at the beginning, middle, or end of the word by clicking on the engine, car, or caboose, respectively. In this embodiment, the game continues at the same level until at least nine correct responses are given by the player. The game then progresses to more challenging sounds. In this second task or activity, the game will not drop back to a previous level but instead will remain at the same level until the criterion for advancement is met.

This game tests and provides training for auditory attention, auditory discrimination, auditory memory, phoneme identification, sound-symbol correspondence, and phonological awareness.

A third game used in the presently preferred embodiment increases auditory segmentation skills, attention and memory skills and phonological awareness skills by having the player count the number of beats and speech sounds in a series and the number of sounds and syllables in a word.

In a first task or activity of this game a cartoon drummer presents a series of 1–4 drum beats. The player must wait until the drummer has completed its play and the speaker icon appears on the screen 16. The player must then position the cursor on the screen 16 and click once for each drum beat heard before a sound begins to play. After at least 8 out of 10 correct responses are made, the game automatically increases the level of difficulty by increasing the amount of time between each drum beat and by eliminating auditory feedback during the player's response. After the player becomes proficient at counting drum beats, the game advances the level of difficulty by presenting speech sounds. The player must click for each speech sound heard. The game continues to advance by increasing the amount of time between each speech sound and by eliminating auditory feedback.

After the player has mastered the first task of the game, the game then automatically advances to a second activity or task by asking the player to count each syllable or speech sound in a word with and without auditory feedback. The player must click the mouse once for each symbol or sound heard in the word. In this game, the level will not drop back but instead will remain at the same level until the criterion for advancement is met.

This game tests and improves auditory attention, auditory (sequential) memory, auditory, phoneme and syllable segmentation, and phonological awareness.

In another game in the preferred embodiment, the player learns to blend words into compound words and blend syllables and sounds into words, thereby increasing auditory synthesis skills, attention and memory skills and phonological awareness skills. In this game, three pictures appear on the screen 16. A cartoon character presents two words that make a compound word. The player must position the cursor and click on the picture that corresponds with the compound word spoken by the cartoon character before the cartoon character walks off the screen.

After three consecutive correct responses, the game automatically advances a level by increasing the time between words and by introducing more similar response choices.

When the player becomes proficient in blending words into compound words, the game automatically advances to the next level and presents syllables and sounds to blend into words. The player must position the cursor and click on the picture that corresponds with the word that is composed of the syllables or sounds presented. The game continues to increase in difficulty by using longer presentation intervals, increasing the number of syllables or sounds presented, and varying the similarity of the response choices. After two consecutive incorrect responses, the level of play is automatically decreased.

This game tests and improves auditory attention, auditory (sequential) memory, phoneme and syllable synthesis, and phonological awareness.

Another of the games used in the presently preferred embodiment helps the player to learn to hear the differences between vowels and vowel-consonant combinations. This game increases auditory discrimination, attention, and memory skills. The game also has two separate activities or tasks.

In the first task of this game a cartoon character collects objects provided by other cartoon characters. For example, the objects may be eggs which are laid by hens. In the preferred embodiment, two hens of one color (for example white hens) are displayed in a nest on one side of the screen and two hens of a different color (for example a white and a brown hen) are displayed in a nest in a different portion of the screen 16. The cartoon character presents two vowel sounds to the player. If the two sounds are the same, the player must click on the nest with the two hens of the same color before an egg falls from the nest to the ground. If the two sounds are different, the player must click on the nest with the hens of different colors. The game continues at this level until the player responds correctly on all same vowel pairs and at least five of six different vowels pairs. The game then automatically advances the level of difficulty by increasing the similarity of the vowel sounds.

In a second activity, the player must determine whether the consonant-vowel symbols presented are the same or different. In this activity the cartoon character presents two consonant-vowel syllables that have been acoustically enhanced. Commercially available software such as KLSYN (available from Sensimetrics Corp., Cambridge, Mass.) may be used to provide computer modified speech patterns to provide the acoustic enhancement. This computer modified speech is used to make the important parts of speech more easily heard by the user. The acoustic enhancement is gradually removed as the player's skills improve. Preferably, the system may also be provided with headphones (not shown) so the player can listen to the enhanced sounds at optimum conditions.

In this game, if the consonant-vowel symbols are the same, the player must click on the nest with the two hens of the same color. If the sounds are different the player must click on the nest with the different color hens.

After four consecutive correct responses, the game automatically advances the level of difficulty by increasing the similarity of the consonant-vowel symbols and by reducing the acoustic enhancement of the sounds.

When the player becomes proficient at discriminating one pair of consonant-vowel symbols, the game automatically advances to more challenging pairs of consonant-vowel symbols. The game automatically decreases to the previous level after two consecutive incorrect responses.

This game tests and improves auditory attention, auditory discrimination, and auditory memory.

In another game of the present invention, the player is tested and trained in rhyming skills, using both rhyming and non-rhyming activities. This game tests and improves rhyming skills, auditory figure-ground discrimination, and attention and memory skills. This game also includes two tasks or activities.

In the first task, in this game, the player must first determine which words presented do not rhyme. A series of cartoon characters, for example three frogs, appear on the display screen 16 and each speaks a different word. One of the words does not rhyme with the other two. The player must click on the frog whose word does not rhyme with the others before the frog jumps into the water. After three consecutive correct responses, the game automatically advances the level by increasing the number of frogs and by introducing three levels of background noise (for example swamp noise). After two consecutive incorrect responses, the level of play is automatically decreased.

In a second task or activity, the player must determine which word rhymes. This activity is initiated after the player has successfully identified non-rhyming words at five levels of difficulty. In the second activity or task the cartoon character (frog) speaks a word. Two other frogs each speak different words. One word rhymes with the word spoken by the first frog. The player must click on the frog whose word rhymes with the one spoken by the first frog. After three consecutive correct responses, the game automatically advances in difficulty, and will decrease a level after two consecutive incorrect responses.

Figure 3A:
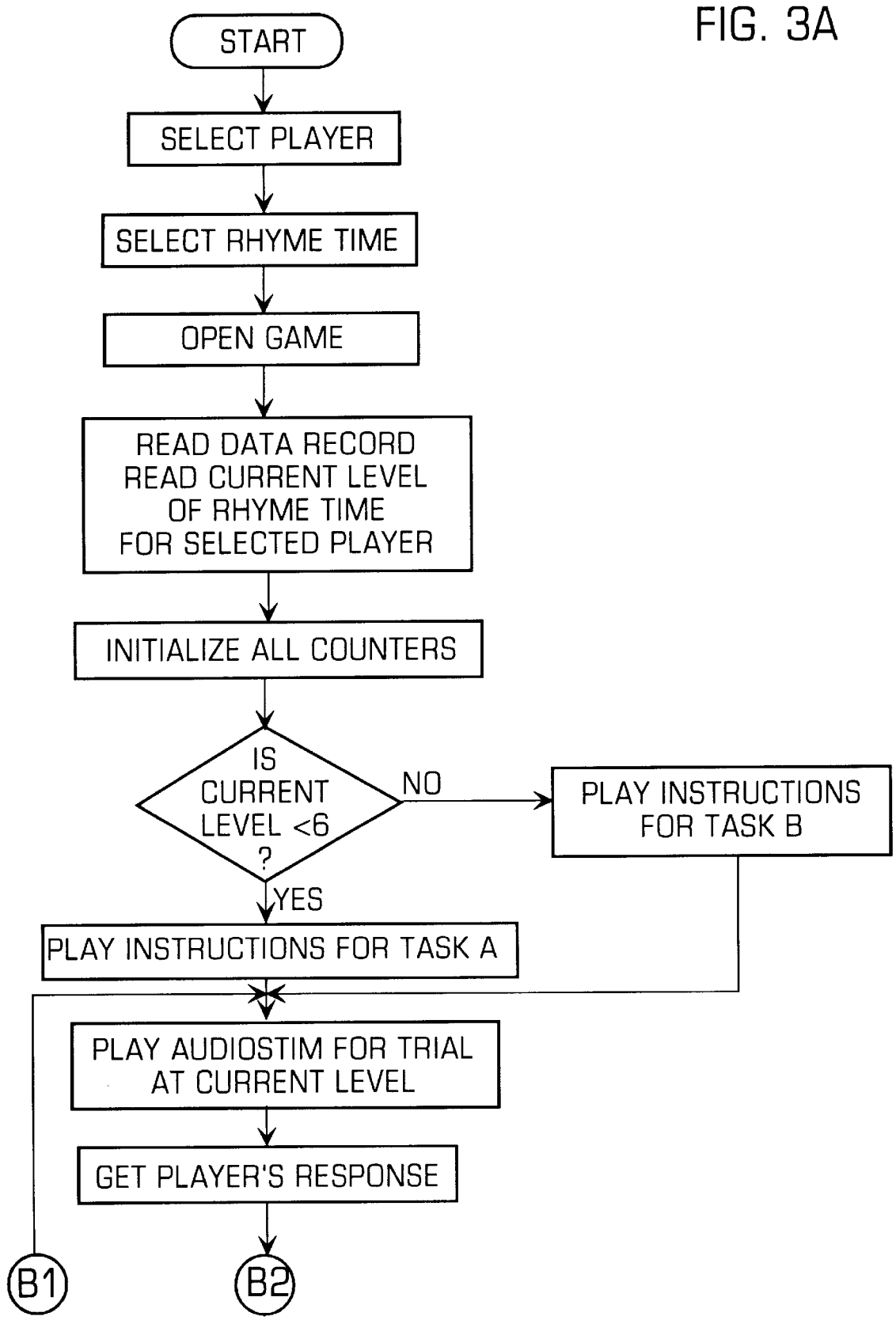
FIGS. 3A and 3B are a flow chart of the game logic for one of the games used in a preferred embodiment of the present invention.
Figure 3B:
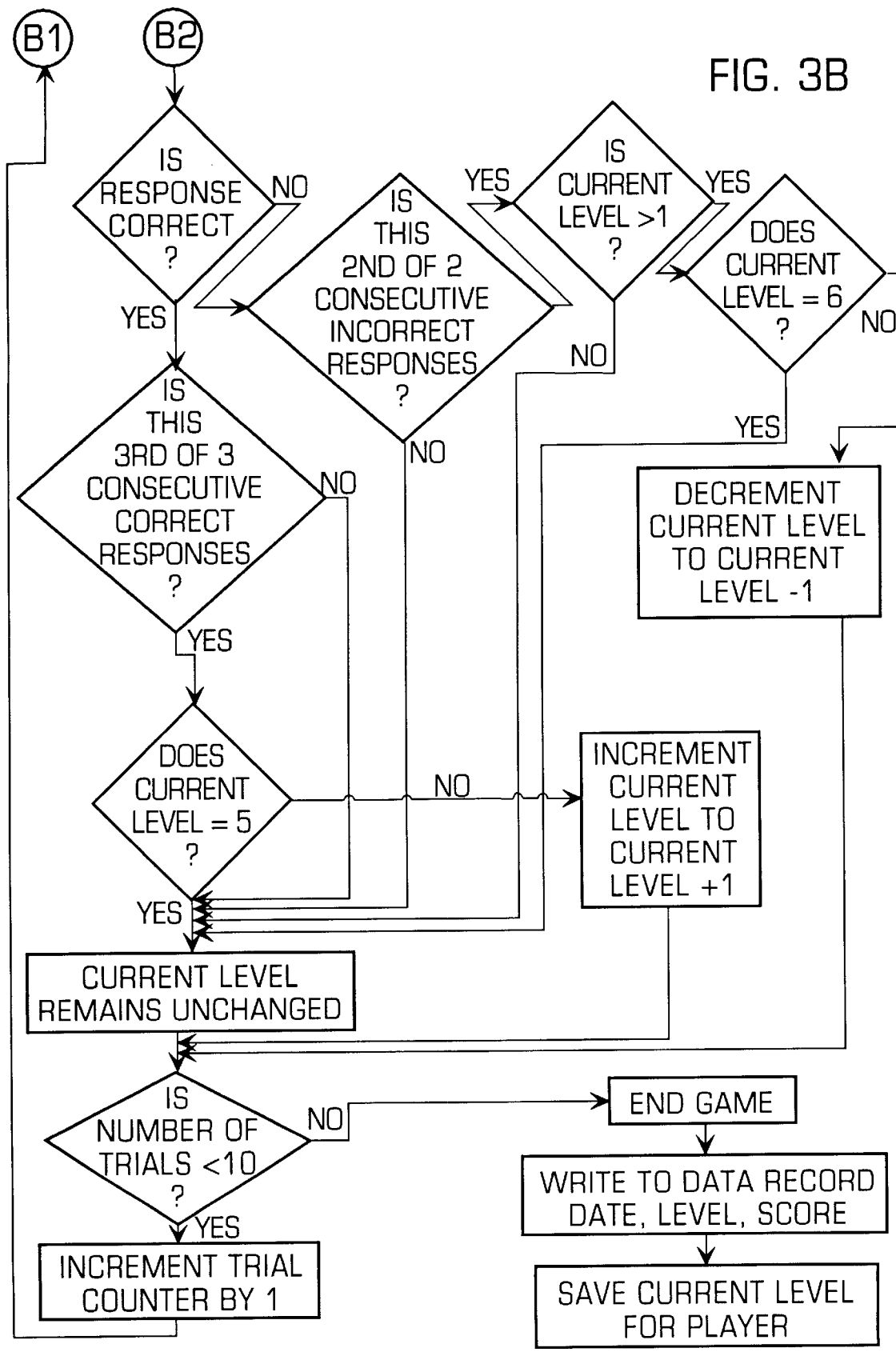

This game tests and improves auditory attention, auditory figure-ground discrimination, auditory (sequential) memory, and rhyming and phonological awareness skills. A flow chart of the logic for this game is provided in FIG. 3. Flow charts for the other games described below are not provided but may be readily derived by those skilled in the art from the description provided herein and the attached appendix.

In the particularly preferred embodiment, the program also includes a feature which allows the player's data records to be viewed on the display 16 and printed if desired on the printer 22. The option to select this feature is provided in the main menu of the program. Once selected, the user must select the particular child's name to be reviewed (since the game can be played by many players whose records are stored in the computer's memory). The computer has stored in memory the particular games played by each individual child and the child's progress through each of those games. The records displayed on the screen 16 will show the primary skills targeted during play of each of the games and the learning objectives that are written in standard IEP format for each of the games. The data record for each player includes the date on which the child played a selected game, the specific parameters of the levels at which the child played, and a cumulative score for each level played. The data will include the final number of responses during which the player met the performance criterion and subsequently advanced to the next level. A separate cumulative score is calculated by the microprocessor 12 for each date of play.

The relative amount of difficulty a player experiences at any given level of training is reflected in the player's cumulative score for that level of training. For example, the performance criterion for advancement to the next level of play in one of the games is four consecutive correct responses. If the player is immediately successful and responds correctly on the first four responses (4/4 correct) the cumulative score for that level of play will be 100%. However, if the player makes two incorrect responses before making four consecutive correct responses (4/6 correct), the cumulative score for that level of play will be 67%.

This data reporting feature allows the continual monitoring of the player's responses which are readily reviewable on the screen 16 and may be printed if desired. A variety of options may be provided, such as printing by date, by range of dates or all dates.

Preferably, the program may have password protection that can be toggled on and off.

The program may also preferably be programmed such that the skills for each child are customizable. That is, the games may be repeated or certain games are not played (i.e., the games can be turned on or off). The individual games may also be tailored such that the level is selected, the order of play may be changed, a play may be skipped, etc.

Therefore, the present invention provides an interactive and rewarding multi-media format which a child may use to exercise the skills that make him or her a better listener and more aware of the sounds of language. With the multi-level game format and systematic control of important learning variables, the player receives extensive practice which is needed to develop, build and strengthen these important skills.

The computer modified feature is used to make important parts of the speech more easily heard. The acoustic enhancement is gradually removed as the player's skills improve. With the present invention, the player's performance is continuously monitored and the game automatically adjusts to the player's skill level. With this adaptive learning program, the player progresses step-by-step to more challenging levels at his or her own rate of learning.

Since the preferred embodiment of the present invention provides a game format with cartoon graphics, and may include other enticing features such as lively music, the learning is made fun to the user. Further, play-by-play scoring is provided in the preferred embodiment. This gives the player immediate feedback and motivates the player to excel. The auditory game logic and phonological game logic of the present invention provide critical learning tools for any child. The invention may also be used as a learning tool for any user, whether child or adult, which may be identified with special learning needs including speech/language, cognitive, attention, or processing deficits; dyslexia and language-based learning disabilities; hearing impairment; children with a history of chronic ear infections; and children learning English as a second language. The presently preferred embodiment of the invention is in the English language. Those skilled in the art will recognize that the present invention may be used in languages other than English.

The multi-levels of difficulty for each game deliver extensive practice and comprehensive training of a variety of auditory and phonological processing skills, including auditory attention, auditory discrimination, auditory figure-ground discrimination, auditory memory, phonemic synthesis, sound segmentation, auditory and phonemic identification, sound-symbol correspondence, rhyming awareness, and phonological awareness.

It will be recognized by those skilled in the art that many other system arrangements and games may be devised for testing and improving auditory and phonologically skills. The description given above of the preferred embodiments of the present invention has been presented for purposes of illustration and description. The described embodiments are not intended to be exhaustive or to limit the invention to the precise forms disclosed. Obviously modifications and variations are possible in light of the above teachings. The embodiments which were described were chosen in order to best explain the principles of the invention and its practical applications. It is intended that the scope of the invention be defined by the following claims, including all equivalents.

What is claimed is:

1. An interactive sound awareness skills improvement system, comprising:
   a microprocessor;
   a display connected to the microprocessor;
   a speaker connected to the microprocessor;
   phonological game logic run on the microprocessor, the phonological game logic providing at least one audible sound through the speaker and a phonological test regarding the at least one sound to which a user must respond, the phonological test being graphically displayed on the display;
   auditory game logic run on the microprocessor, the auditory game logic providing at least one audible sound through the speaker and an audible test regarding said at least one sound to which the user must respond, the auditory game being graphically displayed on the display;
   an input device connected to the microprocessor for the user to identify the correct response to the phonological test and the auditory test; and
   logic that adds audible background noise while the sound is provided by at least one of the tests in order to obscure the sound and change the difficulty of the test.

2. The system of claim 1, wherein the background noise adding logic further comprises logic for adding one or more different predetermined levels of background noise to change the difficulty of the test.

3. An interactive sound awareness skill training system being executed on a computer system having a microprocessor, a speaker and an input device interconnected together, the system comprising:

one or more sound awareness games for increasing the skill of the user in different sound awareness skills, each sound awareness game providing a stimulus to the user using the speaker, receiving a response to the stimulus from the user using the input device, each sound awareness game adaptively training the user in the particular sounds awareness skill associated with the particular sound awareness game; and wherein the adaptive training for each sound awareness game comprises means for increasing the difficulty of the sound awareness game when the user responds correctly to the sound awareness game and means for decreasing the difficulty of the sound awareness game when the user incorrectly responds to the sound awareness game so that the sound awareness game ensures that the user receives the proper level of training in a particular sound awareness skill; and wherein the difficulty means further comprises one or more of means for changing the environment surrounding the stimulus to change the difficulty in the user correctly responding to the stimulus and means for changing the memory load placed on the short term phonological memory of the user associated with the stimulus to change the difficulty in the user correctly responding to the stimulus.

4. The system of claim 3, wherein the one or more sound awareness games further comprise a sound recall game to train the user's ability to recall, in order, a series of sounds presented to the user, the sound recall game further comprising means for changing the difficulty of the game.

5. The system of claim 4, wherein the difficulty changing means further comprises means for increasing the number of sounds to be recalled by the user.

6. The system of claim 4, wherein the sound recall game further comprises means for generating a varying amount of background noise in order to change the difficulty in recalling the series of sounds.

7. The system of claim 4, wherein the difficulty changing means further comprises means for concealing the picture for each sound until after that sound has been presented to the user.

8. The system of claim 4, wherein the difficulty changing means further comprises means for changing the types of sounds presented to the user, the types of sounds progressively becoming more difficult to recall.

9. The system of claim 3, wherein the one or more sound awareness games comprise a sound recognition game to train a user's skill at recognizing one or more of long vowel sounds, short vowel sounds and consonant sounds, the sound recognition game further comprising means for changing the difficulty of the game.

10. The system of claim 9, wherein the difficulty changing means further comprises means for changing the type of the sound from sounds more easily perceived to sounds less easily perceived, the difficulty of the perception of the sound based on the inherent acoustic and phonetic properties of the sound.

11. The system of claim 9, wherein the difficulty changing means further comprising means for presenting the sound in isolation to the user, and means, if the user correctly identifies the sound in isolation, for presenting the sound in a word to the user.

12. The system of claim 11, wherein the difficulty changing means further comprises means for identifying the position of the sound within a word.

13. The system of claim 12, wherein the difficulty changing means further comprise means for changing the type of the sound from sounds more easily perceived to sounds less easily perceived, the difficulty of the perception of the sound based on the inherent acoustic and phonetic properties of the sound.

14. The system of claim 3, wherein the one or more sound awareness games further comprise a sound counting game for training a user's skill at recognizing number of sounds presented to the user, the sound counting game further comprising means for changing the difficulty of the game.

15. The system of claim 14, wherein the difficulty changing means further comprises means for altering the time between each sound to change the difficulty of the game.

16. The system of claim 14, wherein the difficulty changing means further comprises means for eliminating feedback to the user in order to increase the difficulty of the game.

17. The system of claim 14, wherein the difficulty changing means further comprises means for presenting different types of sound to increase the difficulty of the game.

18. The system of claim 14, wherein the sound counting game further comprises a word sound counting sub-game for presenting a word to the user and having the user count the smaller sounds units within the word.

19. The system of claim 18, wherein the word sound counting game further comprises means for changing the difficulty of the game comprising means for eliminating auditory feedback to the user.

20. The system of claim 19, wherein the difficulty changing means further comprises means for decreasing the size of the sound units within the word to be counted by the user.

21. The system of claim 3, wherein the one or more sound awareness games further comprise a blending game for training a user's skill at blending two or more smaller solid units into a larger sound unit.

22. The system of claim 21, wherein the sound counting game further comprising means for changing the difficulty of the game comprising means for changing the time between the smaller sound units.

23. The system of claim 21, wherein the difficulty changing means further comprises means for changing the number of smaller sound units.

24. The system of claim 21, wherein the difficulty changing means further comprises means for changing the number of similar response choices.

25. The system of claim 21, wherein the difficulty changing means further comprises means for changing the size of the smaller sound unit.

26. The system of claim 21, wherein the smaller sound units further comprise two or more of syllables, sounds and words and where the larger sound units comprise one or more of words and compound words.

27. The system of claim 3, wherein the one or more sound awareness games further comprise a sound unit distinguishing game for training a user's skill at distinguishing two sounds units, the sound units including one or more of vowels and consonants, the distinguishing game further comprising means for changing the difficulty of the game comprising means for changing the similarity of the sounds units presented to the user.

28. The system of claim 27, wherein the difficulty changing means further comprises means for acoustically enhancing the sounds of at least one of the vowels and consonant-vowel combinations by changing one or more frequency components of the sounds.

29. The system of claim 27, wherein the difficulty changing means further comprises means for changing the type of the sound from sounds more easily perceived to sounds less easily perceived, the difficulty of the perception of the sound based on the inherent acoustic and phonetic properties of the sound.

30. The system of claim 3, wherein the one or more sound awareness games further comprise a rhyming game for training a user's skill at identifying rhyming and non-rhyming words, the rhyming game further comprising means for changing the difficulty of the game comprising means for changing the number of words presented to the user.

31. The system of claim 30, wherein the difficulty changing means further comprises means for changing the level of background noise introduced with the words.

32. The system of claim 30, wherein the difficulty changing means further comprises means for having the user identify non-rhyming words and means, if the user identified the non-rhyming words, for having the user identify rhyming words.

33. An interactive sound awareness skill training system, comprising:
    means for generating at least one sound stimulus to which a user of the system responds in order to improve the skill of the user at sound awareness skills;
    means for generating a predetermined varying amount of background noise that changes the difficulty with which the user identifies the sound stimulus; and
    means for receiving a response from the user to the sound stimulus despite the background noise.

34. The system of claim 33, wherein the background noise generating means further comprises means for increasing the background noise from a first predetermined level to a higher level once the user identifies the sound stimulus when presented with the first predetermined level of background noise, the increasing background noise increasing the difficulty of distinguishing the sound stimulus.

35. The system of claim 34, wherein the background noise generating means further comprises means for decreasing the background noise from the first predetermined level to a lower level if the user fails to identify the sound stimulus with the first predetermined level of background noise so that distinguishing the sound stimulus is easier.

36. An interactive sound awareness skill training system, comprising:
    means for generating a first sound stimulus and a second sound stimulus to which a user of the system responds in order to improve the user's skill at distinguishing the first sound stimulus and the second sound stimulus;
    means for varying the frequency components of at least one sound stimulus to change the difficulty in distinguishing the first and second sound stimulus; and
    means for receiving a response from the user to the first and second sound stimulus to distinguish the first and second sound stimulus.

37. The system of claim 36, wherein the varying means further comprises means for changing the frequency components at least one sound stimulus to make the first and second sound stimulus more similar to each other when the user correctly distinguishes a prior pair of sound stimulus so that distinguishing the first and second sound stimulus is more difficult.

38. The system of claim 37, wherein the varying means further comprises means for changing the frequency components of at least one sound stimulus to make the first and second sound stimulus less similar to each other when the user does not correctly distinguish a prior pair of sound stimulus so that distinguishing the first and second sound stimulus is easier.

39. The system of claim 36, wherein the first and second sound stimulus each comprise a vowel.

40. The system of claim 36, wherein the first and second sound stimulus each comprise a consonant-vowel pair and wherein the varying means comprises means for varying the frequency components of the consonant within the consonant-vowel pair.

41. An interactive sound awareness skill training method comprising:
    training the skill of the user on different sounds awareness skill using one or more sound awareness games, each sound awareness game providing a stimulus to the user using a speaker, receiving a response to the stimulus from the user using an input device, each sound awareness game adaptively training the user in the particular sounds awareness skill associated with the particular sound awareness game; and
    wherein the adaptive training for each sound awareness game comprises increasing the difficulty of the sound awareness game when the user responds correctly to the sound awareness game and decreasing the difficulty of the sound awareness game when the user incorrectly responds to the sound awareness game so that the sound awareness game ensures that the user receives the proper level of training in a particular sound awareness skill; and
    wherein the difficulty means further comprises means for changing the environment surrounding the stimulus to change the difficulty in the user correctly responding to the stimulus or means for changing the memory load placed on the short term phonological memory of the user associated with the stimulus to change the difficulty in the user correctly responding to the stimulus.

42. The method of claim 41, wherein the one or more sound awareness games further comprise using a sound recall game to train the user's ability to recall, in order, a series of sounds presented to the user.

43. The method of claim 42, wherein the sound recall game further comprising changing the difficulty of the game by increasing the number of sounds to be recalled by the user.

44. The method of claim 42, wherein the sound recall game further comprises generating a varying amount of background noise in order to change the difficulty in recalling the series of sounds.

45. The method of claim 42, wherein the difficult changing further comprises concealing the picture for each sound until after that sound has been presented to the user.

46. The method of claim 42, wherein the difficulty changing further comprises changing the types of sounds presented to the user, the types of sounds progressively becoming more difficult to recall.

47. The method of claim 41, wherein the one or more sound awareness games further comprise using a sound recognition game to train a user's skill at recognizing one or more of long vowel sounds, short vowel sounds and consonant sounds, the sound recognition game further comprising changing the difficulty of the game.

48. The method of claim 47, wherein the difficulty changing further comprises changing the type of the sound from sounds more easily perceived to sounds less easily perceived, the difficulty of the perception of the sound based on the inherent acoustic and phonetic properties of the sound.

49. The method of claim 47, wherein the difficulty changing further comprising presenting the sound in isolation to the user, and, if the user correctly identifies the sound in isolation, presenting the sound in a word to the user.

50. The method of claim 49, wherein the difficulty changing further comprises identifying the position of the sound within a word.

51. The method of claim 50, wherein the difficulty changing further comprise changing the type of the sound from sounds more easily perceived to sounds less easily perceived the difficulty of the perception of the sound based on the inherent acoustic and phonetic properties of the sound.

52. The method of claim 41, wherein the one or more sound awareness games further comprise using a sound counting game for training a user's skill at recognizing the number of different sounds presented to the user, the sound counting game further comprising changing the difficulty of the game.

53. The method of claim 52, wherein the difficulty changing further comprises altering the time between each sound to change the difficulty of the game.

54. The method of claim 52, wherein the difficulty changing further comprises eliminating feedback to the user in order to increase the difficulty of the game.

55. The method of claim 52, wherein the difficulty changing further comprises presenting different types of sound to increase the difficulty of the game.

56. The method of claim 52, wherein the sound counting game further comprises using a word sound counting sub-game for presenting a word to the user and having the user count the smaller sound units within the word.

57. The method of claim 56, wherein the word sound counting game further comprises changing the difficulty of the game comprising eliminating auditory feedback to the user.

58. The method of claim 57, wherein the difficulty changing further comprises decreasing the size of the sound units within the word to be counted by the user.

59. The method of claim 41, wherein the one or more sound awareness games further comprise using a blending game for training a user's skill at blending one or more smaller sound units into a larger sound unit, the sound counting game further comprising changing the difficulty of game.

60. The method of 59, wherein the difficulty changing further comprising changing the time between the smaller sound units.

61. The method of claim 59, wherein the difficulty changing further comprises changing the number of smaller sound units.

62. The method of claim 59, wherein the difficulty changing further comprises changing the number of similar response choices.

63. The method of claim 59, wherein the difficulty changing further comprises changing the size of the smaller sound unit.

64. The method of claim 59, wherein the smaller sound units comprise one or more of syllables, sounds and words and wherein the larger sound units comprise one or more of words and compound words.

65. The method of claim 41, wherein the one or more sound awareness games further comprise using a sound unit distinguishing game for training a user's skill at distinguishing between sound units, the sound units including vowels and consonants, the distinguishing game further comprising changing the difficulty of the game by changing the similarity of one of the vowels and consonants presented to the user.

66. The method of claim 65, wherein the difficulty changing comprises acoustically enhancing the sounds of one of the vowels and consonant-vowel combinations by changing or more frequency components of the sounds.

67. The method of claim 65, wherein the difficulty changing further comprises changing the type of the sound from sounds more easily perceived to sounds less easily perceived, the difficulty of the perception of the sound based on the inherent acoustic and phonetic properties of the sound.

68. The method of claim 41, wherein the one or more sound awareness games further comprise using a rhyming game for training a user's skill at identifying rhyming and non-rhyming words, the rhyming game further comprising changing the difficulty of the game by changing the number of words presented to the user.

69. The method of claim 68, wherein the difficulty changing further comprises changing the level of background noise introduced with the words.

70. The method of claim 68, wherein the difficulty changing further comprises having the user identify non-rhyming words and means, if the user identified the non-rhyming words, having the user identify rhyming words.

71. An interactive sound awareness skill training system being executed on a computer system having a microprocessor, a speaker and an input device interconnected together, the system comprising:

one or more sound awareness games for increasing the skill of the user in different sound awareness skills, each sound awareness game providing a stimulus to the user using the speaker, receiving a response to the stimulus from the user using the input device, each sound awareness game adaptively training the user in the particular sounds awareness skill associated with the particular sound awareness game;

wherein the adaptive training for each sound awareness game comprises means for increasing the difficulty of the sound awareness game when the user responds correctly to the sound awareness game and means for decreasing the difficulty of the sound awareness game when the user incorrectly responds to the sound awareness game so that the sound awareness game ensures that the user receives the proper level of training in a particular sound awareness skill; and wherein the difficulty means further comprises means for changing the environment surrounding the stimulus to change the difficulty in the user correctly responding to the stimulus.

72. An interactive sound awareness skill training system being executed on a computer system having a microprocessor, a speaker and an input device interconnected together, the system comprising:

one or more sound awareness games for increasing the skill of the user in different sound awareness skills, each sound awareness game providing a stimulus to the user using the speaker, receiving a response to the stimulus from the user using the input device, each sound awareness game adaptively training the user in the particular sounds awareness skill associated with the particular sound awareness game; and wherein the adaptive training for each sound awareness game comprises means for increasing the difficulty of the sound awareness game when the user responds correctly to the sound awareness game and means for decreasing the difficulty of the sound awareness game when the user incorrectly responds to the sound awareness game so that the sound awareness game ensures that the user receives the proper level of training in a particular sound awareness skill; and wherein the difficulty means further comprises means for changing the memory load placed on the short term phonological memory of the user associated with the stimulus to change the difficulty in the user correctly responding to the stimulus.

* * * * *